(12) United States Patent
Reeves et al.

(10) Patent No.: US 8,250,584 B1
(45) Date of Patent: Aug. 21, 2012

(54) DEVICE LOCATION APPLICATION PROGRAMMING INTERFACE

(75) Inventors: Raymond Emilio Reeves, Olathe, KS (US); Ryan Alan Wick, Apollo Beach, FL (US); John Marvin Jones, III, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1071 days.

(21) Appl. No.: 12/173,077

(22) Filed: Jul. 15, 2008

(51) Int. Cl.
*G06F 3/00* (2006.01)
*G06F 1/00* (2006.01)
(52) U.S. Cl. ......................................... 719/310; 713/300
(58) Field of Classification Search .................. 719/310; 713/300
See application file for complete search history.

(56) References Cited

PUBLICATIONS

Robin Kravets, Power Management Techiques for Mobile Communication, 1998.*

* cited by examiner

*Primary Examiner* — Lechi Truong

(57) ABSTRACT

Media, methods and interfaces are provided for interfacing a mobile device and an application virtual machine to provide location information of the mobile device from a secondary source. When location information supplied by a first source to the application virtual machine contains invalid values for device location, a secondary source is utilized to provide the location information. No new processing thread is spawned for collection of back-up source configurations. Thus, interfaces initiate the first and second location determination methods in a single request. The power consumed by the mobile device to retrieve the device location information from a secondary source is reduced by the absence of additional configuration collection threads. Interfaces include a primary location component, a verification component, a backup location component, and a location update component.

20 Claims, 6 Drawing Sheets

DEVICE LOCATION APPLICATION PROGRAMMING INTERFACE

BACKGROUND

Many mobile devices today, such as cellular phones and personal data assistants (PDAs) use the Java™ 2 Platform Micro Edition (J2ME) framework as an underlying platform. This framework is prevalent for use with devices that are unable to take full advantage of other platforms such as Java™ Standard Edition, because of resource limitations, like reduced memory capacity, interface limitations, etc. Even with such constraints, each edition of the framework must meet standards that are regularized in response to a Java™ Specification Request (JSR). Through the Java™ Community Process (JCP), updated versions, optional packages, and newly found needs can be codified. Basic and optional specifications allow users foundational device capabilities, as well as the ability take advantage of web services. Such application programming interfaces (APIs) enable web functions such as secure and trustworthy connections, and wireless online payments. Another burgeoning area of optional packages is apparent in the combination of cellular phones and personal data assistants (PDAs) with previously separate devices, such as cameras, music players, and global positioning system (GPS) devices. However, the focus in some specifications on resource-limited devices results in providing standardization that may not be the most efficient use of the device's computational capabilities. For example, many mobile devices now have multiple means for determining the location of the device. Yet, the secondary means typically requires multiple processing threads to collect configuration parameters each time the secondary method is used. Unnecessary processing then consumes power, shortening battery life.

SUMMARY

Embodiments of the invention are defined by the claims below. A high-level overview of embodiments of the invention is provided.

In a first embodiment, a computer-implemented method interfaces a mobile device and an application virtual machine to provide location information of the mobile device from a secondary source. Location information supplied by a first source is provided to the application virtual machine. Whether or not the location information provided to the virtual machine contains valid values for device location is determined. If the location information contains valid values for device location, that information is provided to subsequent virtual machines as needed. However, if the location information does not contain valid values, a secondary source is utilized to provide the location information.

In a second embodiment, computer-readable media perform a method of interfacing a mobile device and an application virtual machine for retrieval of device location information from multiple sources. The power consumed by the mobile device to retrieve the device location information from a secondary source is reduced. Whether location information received from a first source contains invalid values for device location is verified. Upon verification that the location information received from the first source contains invalid values for device location, location information from a second source is retrieved. This backup process occurs without spawning a new processing thread for the collection of secondary source configurations.

In a third embodiment, an interface between a mobile device and an application virtual machine initiates a first and second location determination method in a single request. The interface includes a primary location component, a verification component, a backup location component, and a location update component. The primary location component is operable to return a first set of values from a first source configured to return mobile device location information. The verification component is operable to confirm the validity of the first set of values received. The backup location component is operable to return a second set of values from a second source configured to return mobile device location. The location update component is operable to, in a single request, query the primary location component, the verification component, and the backup location component to ascertain current mobile device location information.

BRIEF DESCRIPTION OF THE SEVERAL VIEWS OF THE DRAWINGS

Illustrative embodiments of the invention are described in detail below with reference to the attached drawing figures, which are incorporated by reference herein and wherein.

DETAILED DESCRIPTION

Figure 1:
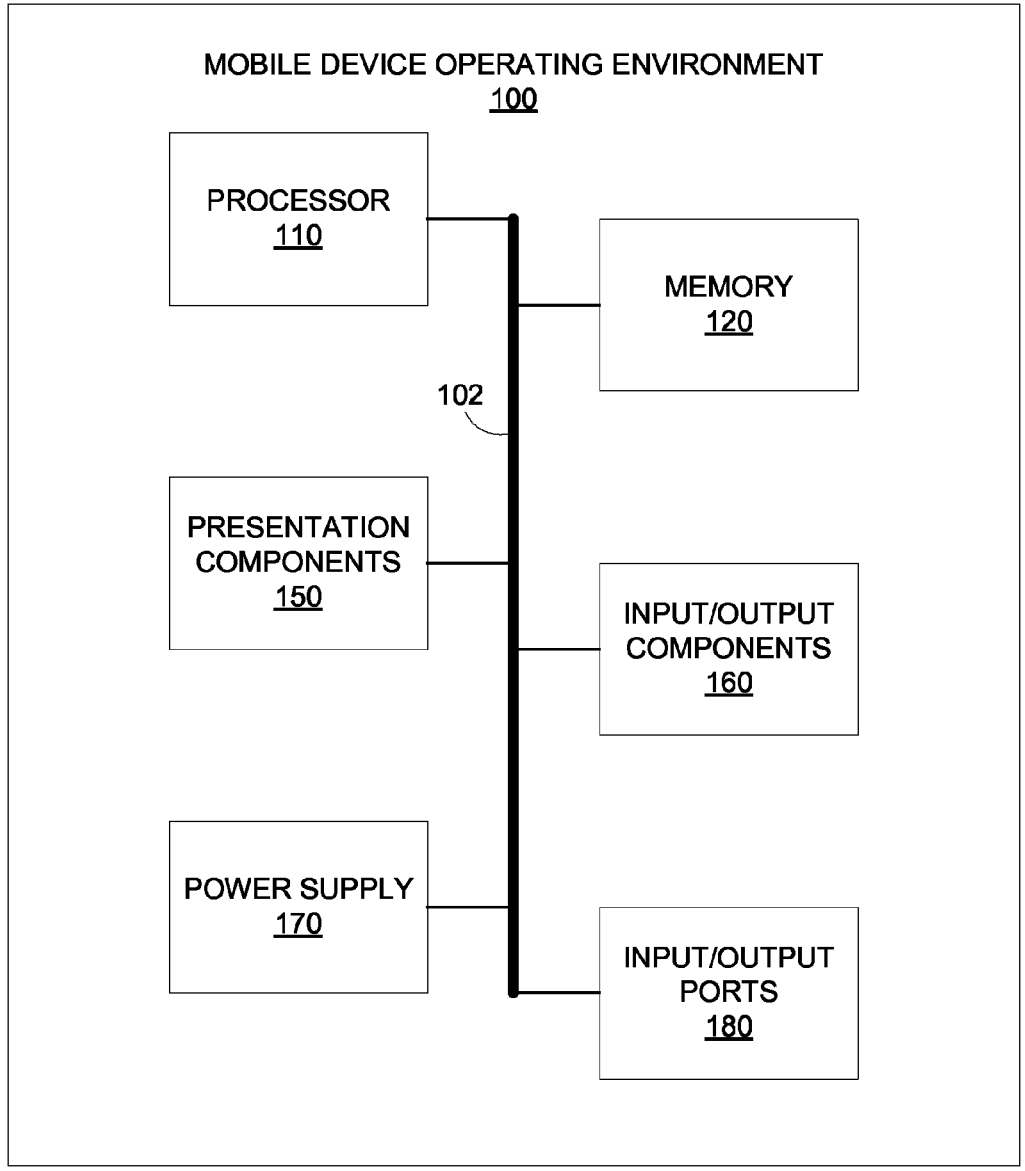
FIG. 1 depicts an exemplary operating environment of a mobile device in accordance with embodiments of the invention.

Embodiments of the invention provide methods, media, and interfaces for mobile devices to provide device location information to application virtual machines (VMs). More particularly, mobile devices are configured to query a second source for determining device location in a more efficient manner. Improving the application programming interface (API) that provides this functionality can reduce mobile device processing required by simplifying implementation of location queries into single-threaded requests. Using predetermined settings for certain variables associated with the second source and the device allows the API to avoid spawning new threads to retrieve the configuration data. Additionally, the reduction in mobile device processing reduces the power needed by the mobile device to fulfill the query. Another improvement is the reduction of development complexity for mobile device providers. Thus, by encouraging efficient processing, several aspects of the development and use of the mobile device are augmented.

Throughout the description of the invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the invention. The following is a list of these acronyms:

| | |
|---|---|
| API | Application Programmatic Interface |
| CD-ROM | Compact Disc-Read Only Memory |
| CLDC | Connected Limited Device Configuration |
| DVD | Digital Versatile Discs |
| EEPROM | Electronically Erasable Programmable Read Only Memory |
| GPS | Global Positioning System |
| GUI | Graphical User Interface |
| I/O | Input/Output |
| J2ME | Java ™ 2 Platform, Micro Edition |
| JCP | Java ™ Community Process |
| JSR | Java ™ Specification Request |
| MIDP | Mobile Information Device Profile |
| OS | Operating System |
| PDA | Personal Data Assistant |
| RAM | Random Access Memory |
| ROM | Read Only Memory |
| VM | Virtual Machine |

Further, various technical terms are used throughout this description. An illustrative resource that fleshes out various aspects of these terms can be found in Newton's Telecom Dictionary by H. Newton, 24th Edition (2008).

Embodiments of the invention include, among other things: a method, system, or computer-program product. Accordingly, the embodiments may take the form of a hardware embodiment, a software embodiment, or an embodiment combining software and hardware. In one embodiment, the invention takes the form of a computer-program product that includes computer-useable instructions embodied on one or more computer-readable media.

Computer-readable media include both volatile and nonvolatile media, removable and non-removable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The invention will be described within the context of mobile devices with which it is compatible. As such, these mobile devices use the Java™ 2 Platform Micro Edition (J2ME) framework as an underlying platform. As discussed above, a Java Specification Request (JSR) is part of the standardization process for this platform. One basic specification is JSR-30, which was developed as a first minimum library set needed to enable the use of virtual machines (VMs). This specification implements what is also known as version 1.0 of the Connected Limited Device Configuration (CLDC). The specification, and its update (JSR-139 for CLDC 1.1), are concerned with the most resource-constrained devices, such as low-memory cell phones and pagers. Another such foundational specification is that describing the Mobile Information Device Profile (MIDP), which provides a graphical user interface (GUI) API as part of JSR-37. This aspect of the overall platform also has been updated in the form of JSR-118, which implements MIDP 2.0. In the context of the invention, the mobile devices described will be able, at a minimum, to utilize JSR-139 for CLDC 1.1. Of course, there are devices that implement standards that extend beyond this specification, and therefore are compatible with the invention.

The figures, in general, will use similar numbering conventions from figure to figure, where practical, to show like or substantially similar features. With regard initially to FIG. 1, an exemplary operating environment for implementing embodiments of the invention is shown and designated generally as mobile device operating environment, alternatively referred to as mobile device 100. Mobile device 100 is but one example of a suitable mobile environment and is not intended to suggest any limitation as to the scope of use or functionality of the invention. Neither should mobile device 100 be interpreted as having any particular dependency or requirement relating to any one or combination of modules or components illustrated.

Embodiments may be described in the general context of computer code or machine-useable instructions, including computer-executable instructions such as program modules, being executed by a cellular phone, a personal data assistant (PDA) or other handheld mobile device. Generally, program modules including routines, programs, objects, modules, data structures, and the like, refer to code that performs particular tasks, or implement particular data types. Embodiments may be practiced in a variety of system configurations, including hand-held devices, consumer electronics, specialty computing devices, etc.

With continued reference to FIG. 1, mobile device 100 includes a bus 102 that directly or indirectly couples the following components: one or more processors 110, memory 120, one or more presentation components 150, input/output (I/O) components 160, I/O ports 180, and an illustrative power supply 170. Bus 102 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider presentation components 150, such as a display screen, to be an I/O component. Also, processors have memory. The inventors hereof recognize that such is the nature of the art, and reiterate that the diagram of FIG. 1 is merely illustrative of an exemplary mobile device 100 that can be used in connection with one or more embodiments. Distinction is not made between such categories as "web-enabled cellular phone," "personal data assistant," etc., as all are contemplated within the scope of FIG. 1 and reference to "mobile device."

Mobile device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by mobile device 100.

Mobile device 100 includes one or more processors 110 that read data from various entities such as memory 120 or I/O components 160. Memory 120 includes computer-storage media in the form of volatile and/or nonvolatile memory. Memory 120 may be removable, non-removable, or a combination thereof. Exemplary devices for memory 120 include solid-state memory, hard drives, optical-disc drives, etc. Presentation components 150 present data indications to a user or other device. Exemplary presentation components 150 include a display screen, speaker, vibrating module, etc. I/O ports 180 allow mobile device 100 to be logically coupled to other devices including I/O components 160, some of which may be built in. Illustrative components include a keyboard, microphone, cursor or focus-movement buttons, satellite devices, touch pad or touch screen, scanner, etc.

As one of ordinary skill in the art will appreciate, the inner workings of even an unsophisticated mobile device can constitute thousands of components, instructions, and the like. As previously discussed, the ability to draw distinct lines is nearly impossible because of the interoperability of many of those components. A block diagram representing interaction of certain components of a mobile device according to embodiments of the invention is depicted in greatly simplified form and will be described below. More specifically, this diagram represents the interaction of a mobile device's operating system (OS) with application virtual machines within memory components of the device. Between the OS and the memory component are application programming interfaces that enable various functions, provide access for other memory locations, and generally enable applications to be used on the device. However, it should be noted that these components may have many more connections to other components not show for the sake of clarity.

Figure 2:
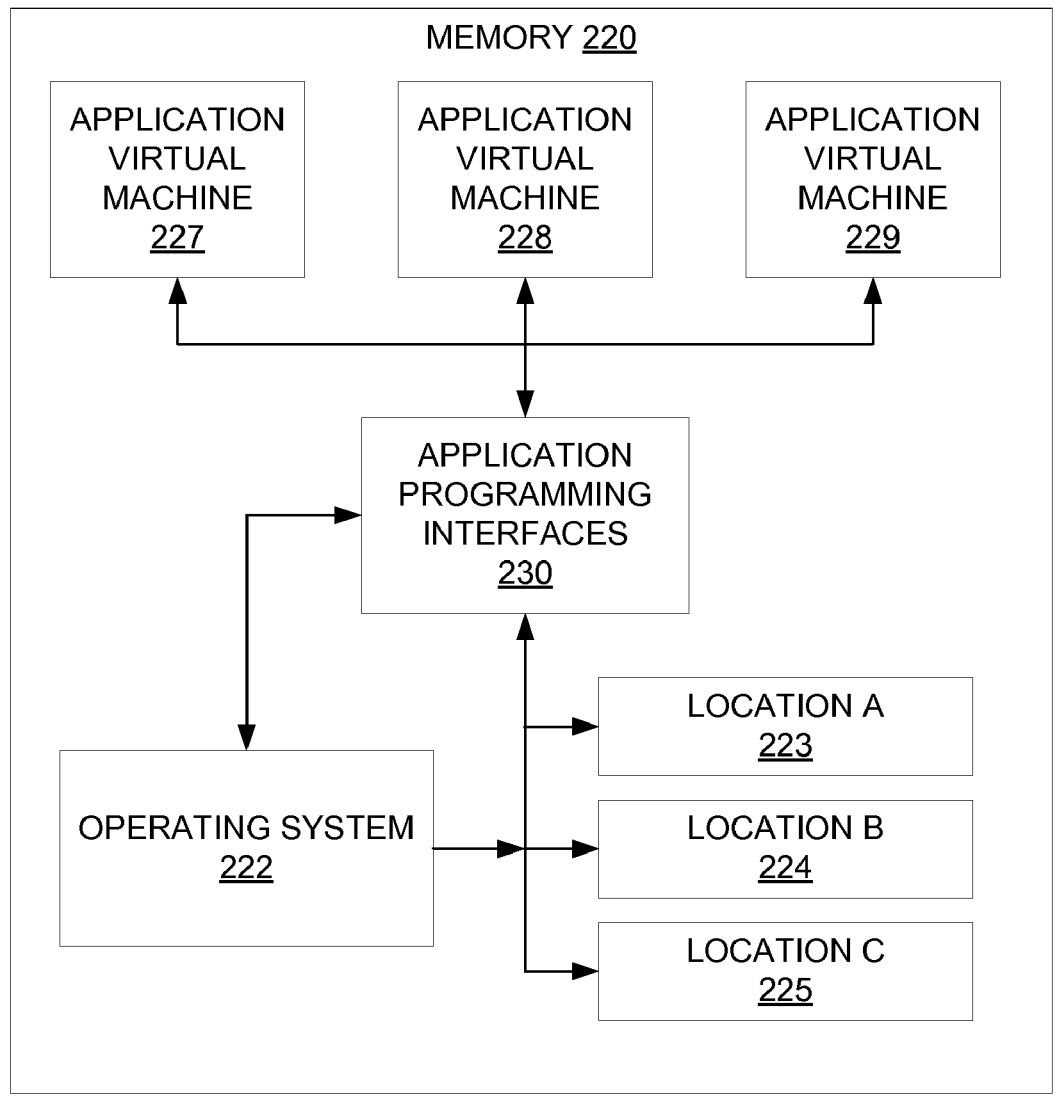
FIG. 2 is a simplified block diagram representing high-level component interaction in accordance with embodiments of the invention.

Turning now to FIG. 2, memory 220 is not intended to contain only the data structures and modules shown, but is simplified for the ease of illustration. Processors and busses will be integrally involved in the reading and writing of data stored within memory 220. Again, for the sake of clarity, an operating system 222 is shown as a discrete component or module in communication with three memory locations 223, 224, and 225, and application programming interfaces 230. Memory locations 223, 224, and 225 are not meant to limit the memory 220 to memory having only three addressable locations outside of the other modules and components. This is illustrative in nature. Memory 220 may have thousands or millions of storage locations, depending on the resources of the device. Operating system 222 functions with memory locations by accepting instructions through a set of application programming interfaces (APIs) 230. This allows applications running on the mobile device to interact with memory locations, other applications, and physical components that are part of, or connected to, the mobile device.

Continuing with FIG. 2, three application virtual machines (VMs) are shown numbered as a VM 227, a VM 228, and a VM 229. These can be Java™ application virtual machines that carry out any type of tasks manipulating files of different media types. For mobile devices that use the J2ME platform, these applications are known as MIDlets. Looking at the exemplary applications in FIG. 2, VM 227 may be a utility MIDlet that allows a user to upload photos for use as the GUI "wallpaper" image. As another example, VM 228 could be a utility application for the download of ringtones and other audio clips. As a final illustration, VM 229 could be a navigational application for presenting the location of the mobile device to the user and directions to user-specified destinations. These are exemplary applications that are common to the devices described above and below, and should not be construed as limiting the scope of the present invention. Instead, all applications consistent with the J2ME platform, particularly those that help determine or utilize device location information, are contemplated within the scope of the described embodiments.

In FIG. 2, the application VMs are in communication with APIs 230 so that the applications may properly interact with operating system 222 and memory storage locations 223-25. APIs 230 will include some or all of the JSR-compliant APIs described above, including foundational specifications, such as JSR-139 for VM-enablement and JSRs 38 or 117 for GUI and assorted other functions. Other specifications that may be necessary for the operation of mobile device 100 have been omitted for the sake of clarity and many specific optional packages will not be described. However, APIs 230 will include at least one package that improves upon an optional API found in JSR-179. JSR-179 is responsible for enabling determination of the mobile device's location, allows for components such as GPS mechanisms to communicate with their respective applications. Many mobile devices today have more than one mechanism with which to determine location. The improved API allows a single request for location update to contact both a primary and secondary source. This extends the capabilities of JSR-179-compliant devices by conducting the update faster, as new processes do not need to be instantiated to contact the secondary source. This reduction also maximizes computational efficiency and therefore minimizes device power consumption.

The following description will focus on methods of interaction and processes of interfacing components according to embodiments of the invention. A first method involves receiving location information for a mobile device from a secondary source via the improved API. After values for location information are received from a first source, a component validates the data. If the data is valid, then a second source is not needed, and the received information can be disseminated to other application virtual machines as needed. If the values are not valid, then a second source is queried using pre-selected configurations.

Figure 3A:
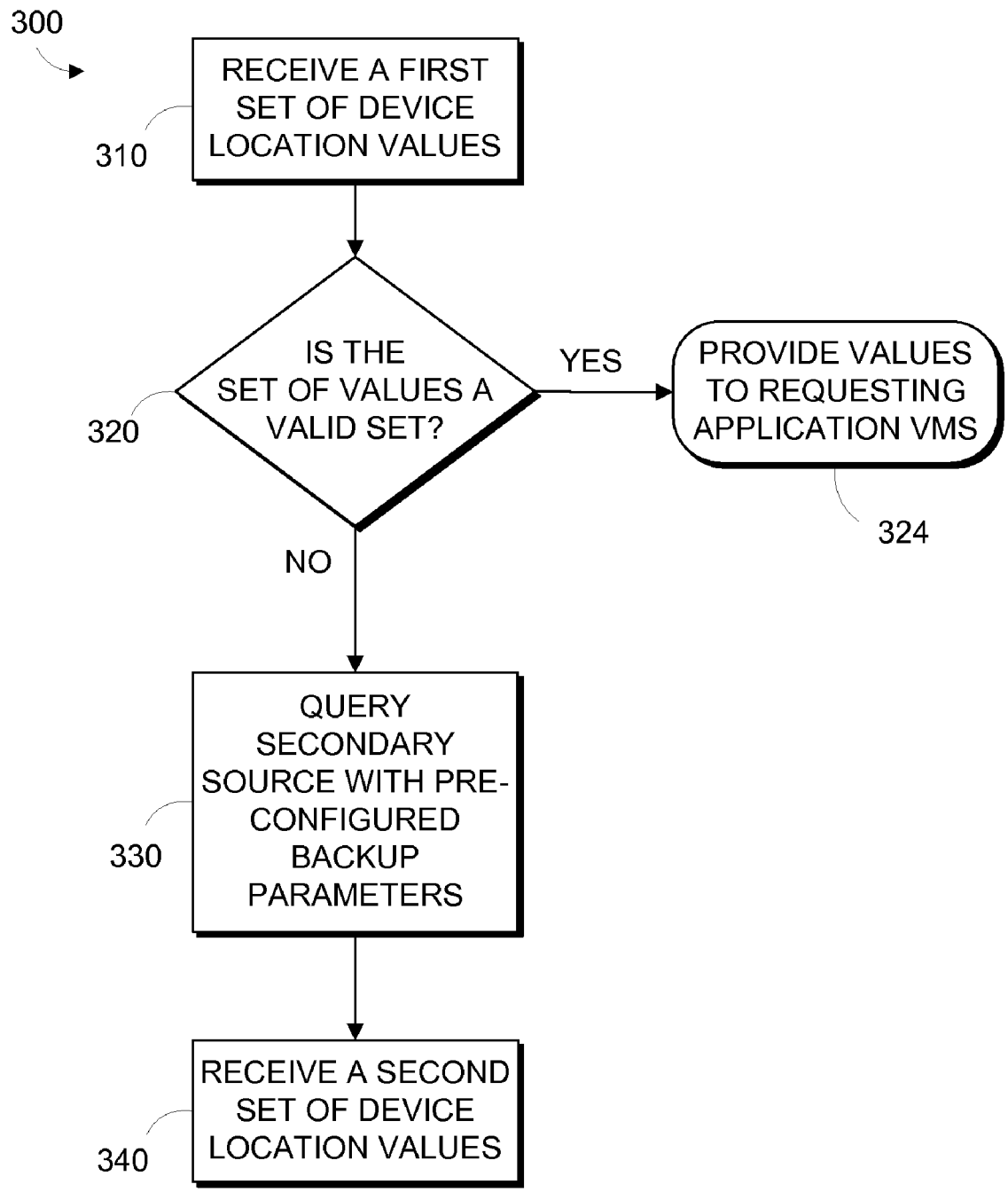
FIG. 3A is a flowchart representing a method of receiving location information for a mobile device from a secondary source according to embodiments of the invention.

Now describing FIG. 3A, a method 300 for receiving location information for a mobile device from a secondary source via an improved API is depicted. A set of values for mobile device location information is received at a step 310. An example of these values could be a set of latitudinal and longitudinal values, along with an altitude reading, all of which denote the precise location of the device. At a step 320, the validity of these values can be determined.

There are a number of ways in which values can be deemed valid or invalid. One method is through a check of ranges that bound certain values. Latitudinal and longitudinal readings are one such example. When used to denote a surface location, a latitudinal value must range, from South Pole to North Pole, between −90 and 90 degrees, respectively. Of course, this measurement is relative to the equatorial reference of zero degrees. Likewise, a longitudinal coordinate will be measured from the reference point of the prime meridian and will range between −180 to 180 degrees. Measuring eastward distance in the positive is the normal convention, with westward distance from the prime meridian measured in a negative fashion.

Another convention is simply referring to all measurements as positive, but giving a directional qualifier, i.e., north, south, east, and west. The validity of a received value can be based on determining whether the latitudinal coordinate is between −90 and 90 degrees and the longitudinal coordinate is between −180 and 180 using the first convention. Values would simply need to be between zero and 90 or zero and 180 in the second convention. This range can be truncated or otherwise modified depending on the device and the application. For a navigational application that is confined to North America only, the range is reduced to positive latitudes and negative longitudes. Second-convention coordinates would need a north or west designator in order to provide a valid location somewhere in North America.

Naturally, there are other checks that may be performed to deem values valid or not. A required accuracy can be established so that a measurement must be within a certain resolution. Again using the latitude-longitude conventions, the 180 degrees of latitude equate to roughly 69 miles per degree. The longitude values vary from the equator to the pole, ranging from 69 to zero miles, respectively. Each degree of latitude can be divided into 60 minutes, thus equaling slightly more than one mile per minute. Those 60 minutes can be sub-divided into 60 seconds, which equates to approximately 100 feet per second of latitude. Longitudinal measurements will vary from the described distances at a maximum to zero as they approach a pole. One requirement that a location-determination method may require is accuracy within a fraction of a second, so that a location is determined within a specified number of feet.

Latitudinal and longitudinal requirements are not the only available means of rendering values valid or invalid. Another instance would be requirements for additional information. For example, an altitude measurement can be required for a valid set of values. However, if no value is available for this one aspect, it could negate what would otherwise denote that the device in a valid location. Likewise, a requirement for additional address information from an address database may be needed for a complete set of valid values. A calculation providing the speed and direction that a mobile device is traveling may be required. Again, these are simply illustrative and should not be construed as limitations to the scope of the invention.

Returning to FIG. 3A, if the values received at step 310 are valid using the configurable criteria as established, the validity check at step 320 directs the method to a step 324. At step 324, the values can be shared with any other application virtual machine that may need those values, e.g., a navigation system. This effectively ends the method without requiring the use of a secondary source. However, if the values received at a step 310 are not valid, then a second source is queried as the method is directed to a step 330. Once the query is processed, a second set of values is returned that denote the mobile device's current location information at a step 340.

One aspect of this query is the pre-determined configurations supplied with the request. This could be required data as explained above. Examples of device configurations that may be pre-determined are information requirement settings. For instance, suppose that altitude measurements are a part of typical location determination. Certain sources may require that an altitude value be determined and passed back to the application virtual machine. However, if the backup source is used for ascertaining the mobile device's location, then the requirement for an altitude measurement may be completely disregarded. Thus, by automatically setting the configuration of this parameter to "FALSE," a value is no longer needed to return valid information. There may be a number of these parameters that require a configuration value of some sort, which will be discussed further below with respect to FIG. 4.

A second method can be performed utilizing an improved API to reduce the power consumption of the device. Values associated with location information from a first source are received. Upon verification that the values received from this first source are invalid, meaning another source for location information is needed, a second source is queried for the relevant data. The second source is queried utilizing pre-configured values for criteria associated with that source. Because the pre-configured values are utilized, additional processing threads are not needed for configuration retrieval. This reduces the computational resources required and, in turn, reduces the power consumption of the mobile device.

Figure 3B:
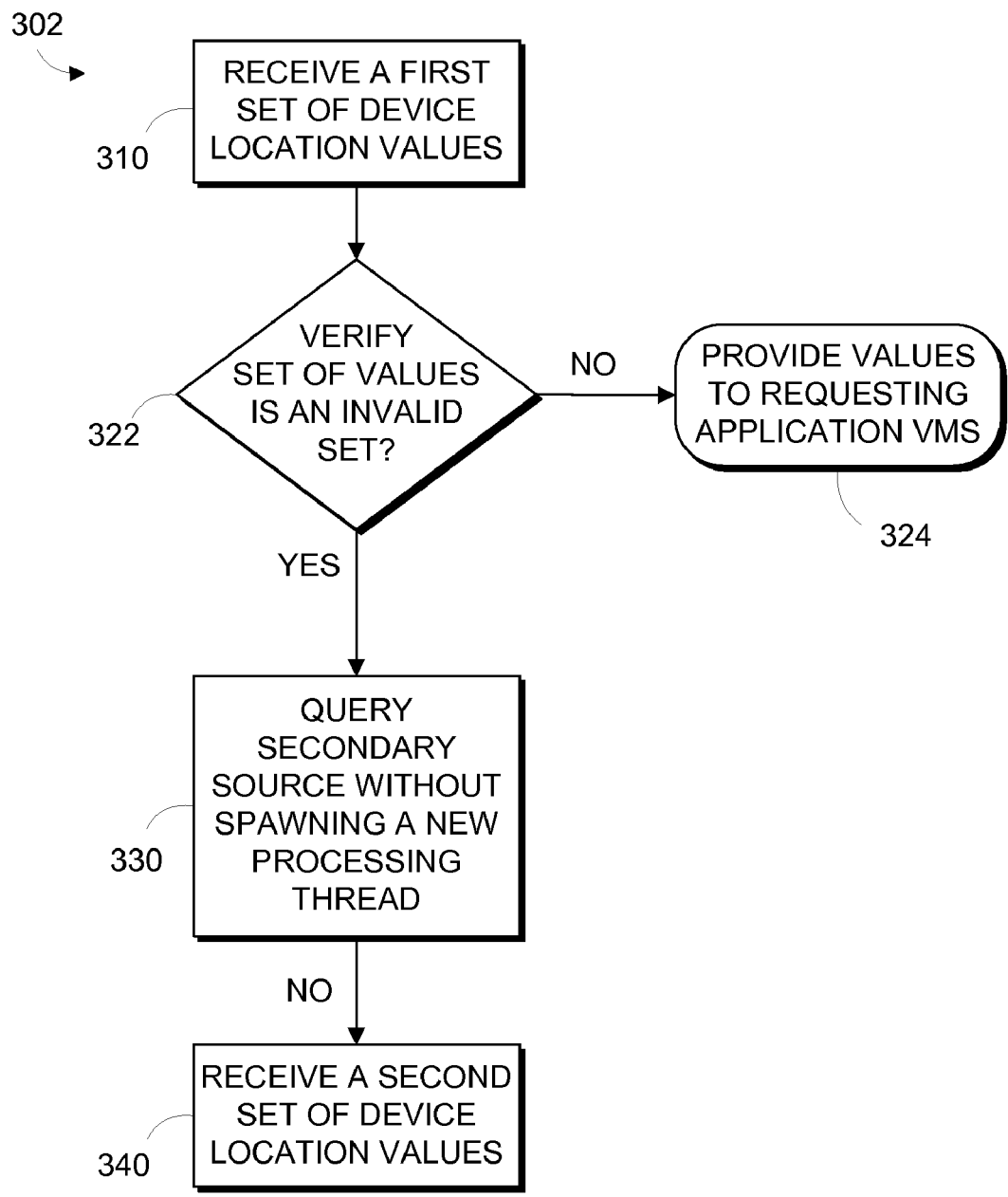
FIG. 3B is a flowchart representing a method of reducing power consumption needed for receiving location information from a secondary source in accordance with embodiments of the invention.

Now a method 302 for receiving location information for a mobile device from a secondary source via an improved API shown in FIG. 3B will be described. At step 310, a set of values for mobile device location information is received. This same-numbering convention is intended to convey that the step is substantially similar to step 310 depicted in FIG. 3A. Departing from the previous method, at a step 322 verification of the invalidity of these values is performed. Thus, if the values are not invalid, the process ends at step 324 by virtue of the first source providing the location. Once again, this means that the location values are shared to applicable application virtual machines. However, if the values are indeed invalid, step 330 is performed to query a second source.

Rather than put the mobile device through a resource-intensive check of numerous parameters, those values are established ahead of time as part of the query. Retrieval of these settings typically requires the use of a new processing thread by the application virtual machine. Thus, by only using a pre-determined configuration that does not require this retrieval, and with it no new thread, computing resources can be conserved.

Another manner in which to simplify a backup request is to ensure that secondary information such as altitude, speed, direction, and address information are not required. This leads to more efficient operation of the mobile device, as well as prolonged battery power by streamlining the computation required. This can also be ensured by the pre-configuration of the source values. A discussion of these parameters and their effects are outlined below.

Figure 4:
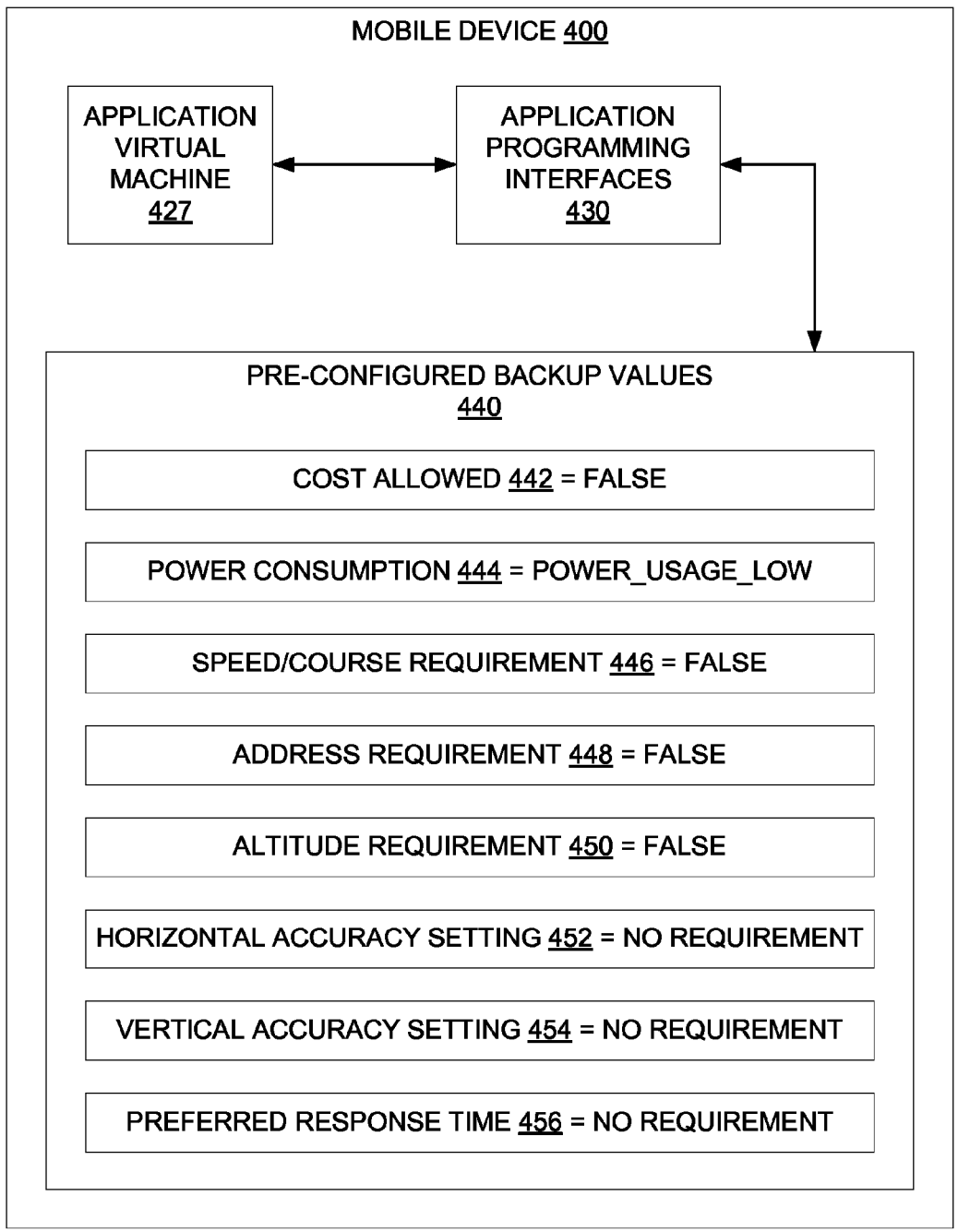
FIG. 4 is a simplified diagram of pre-configured values for backup location-determination methods according to embodiments of the invention.

Turning to description of FIG. 4, a simplified diagram of pre-configured values for backup location-determination methods are depicted. Saved within a mobile device 400, a set of values 440 are intended to be exemplary and any one individual value should not limit the scope of the invention. Values 440 are used by a set of APIs 430 to enable an application virtual machine 427. However, the fact that they are pre-determined is one novel aspect of the invention. Set 440 includes a cost allowed 442, preferred power consumption 444, speed and course requirement 446, address information requirement 448, altitude requirement 450, horizontal accuracy setting 452, vertical accuracy setting 454, and preferred response time 456. Cost allowed 442, speed and course requirement 446, address information requirement 448, and altitude requirement 450 all are shown to have settings of "FALSE." As those values indicate, these are simply Boolean values that determine whether or not the requirement is necessary. Accuracy settings 452 and 454, along with preferred response time 456 all show "NO REQUIREMENT" as the pre-configured setting. Again, this is intended to show that no specified accuracy or response time are needed. There could just as easily be a requirement for the accuracy to fall within some number of feet or within some fraction of a degree of latitude/longitude. The lack of a preferred response time could also be modified to a specified number of minutes, seconds, or fraction thereof. Finally with regard to set 440, preferred power consumption 444 is set to "POWER_USAGE_LOW" in order to reduce battery power consumed while determining the mobile device's location. This could be part of a two-tiered system of "LOW" and "HIGH" settings, a three-tiered system adding a "MEDIUM" value, or any other manner of setting the value consistent with the JSR-179 standard.

When implemented, embodiments of the invention can be thought to exist between the physical device, or physical components of the device, and the application virtual machines that exist on the device. The remainder of the description will outline this process in a high-level, component context. A device location update component will be in communication with, in turn, a primary location-determination module, a verification module, and a secondary location-determination module. This occurs with a single process for requests to each successive module. The location-determination modules are in communication with their respective physical components and the modules that accompany their function. Once complete, the update component can pass information to any application virtual machine that requires such data. Thus, the update modules and those that it communicates with are seen on an interface level sitting between the physical device components on the device level and the application VMs on the application level.

Figure 5:
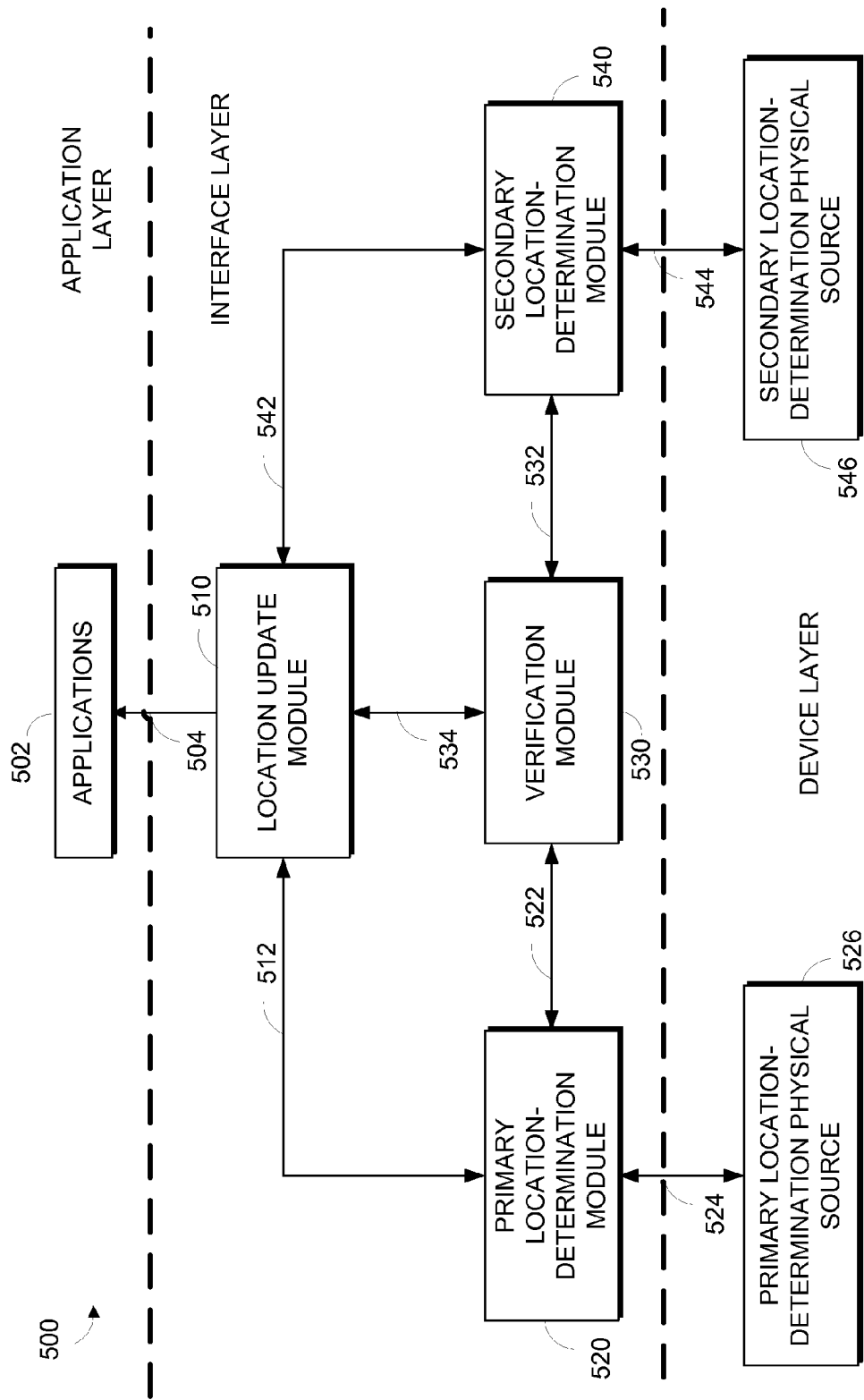
FIG. 5 depicts an exemplary processing flow between components utilized for interfacing a mobile device and application virtual machines in accordance with embodiments of the invention.

FIG. 5 depicts an exemplary processing flow between the aforementioned components utilized for interfacing a mobile device and application virtual machines. A set of components connected by an interface, collectively numbered as a set 500, are shown with the three-layered model. Each level is labeled and is divided from other levels by a set of dotted lines used to denote virtual boundaries. As seen in FIG. 1, the layers will not possess clearly delineated boundaries as components from one layer may offer functionality to one or more of the other layers. A set of applications 502 are represented with a single block to represent any application which may need information from the invention. A set of communications 504 occurs between set of applications 502 and a location update component 510.

Applications 502 are separated by a dotted line from location update component 510, which is depicted in an interface level. Also included on the interface level is a primary location-determination module 520, a verification module 530, and a secondary location-determination module 540. There are a series of arrows to denote the processing thread that instantiates communication between the modules. The like numbered arrows denote a single thread, thus thread 512, 522, 532, and 542 are actually the same processing thread operating at different stages of the API communications. Again, one novel aspect of the invention is the ability of a single request to query both determination modules without the need to spawn a new thread for backup configuration parameter collection.

A first location-determination source 526 and a second location-determination source 546 are separated from the interface level by a second dotted line. These are in the device layer and represent the physical components needed for determining location information, such as GPS components. These two components are in communication with the individual modules responsible for returning information from the physical devices, and are represented with a set of communications 524 and a set of communications 544.

Putting the entire flow together, one of ordinary skill in the art can see how update module 510 queries primary location-determination module 520 through communication 512. This query results in a set of values being returned from primary source 526 as a result of communications 524. Those values are passed to verification module 530 by communication 522. If the verification module finds valid values, then the values are sent straight to update module 510 through a communication 534. However, if the verification module examines the values and confirms that a second source must be queried to obtain valid values, communication 532 is sent to secondary location-determination module 540. Module 540 receives a set of values from secondary physical components 546 as a result of communication 544. Thus, secondary location-determination module 540 is able to convey the values to location update module 510 through communication 542. Once update module 510 has received values from whatever source has provided it, those values may be shared with applications 502 as needed through a communication 504.

Many different arrangements of the various components depicted, as well as components not shown, are possible without departing from the spirit and scope of the present invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-storage media with computer-executable instructions embodied thereon for performing a method of interfacing a mobile device and an application virtual machine for retrieval of device location information from multiple sources, whereby a power consumed by the mobile device to retrieve the device location information from a secondary source is reduced, the method comprising:
    retrieving a first set of values from a first source, the first set of values comprising an attribute associated with mobile device location information;
    confirming whether the retrieved first set of values is valid in a validity confirmation;
    retrieving a second set of values from a second source when the first set of values is not valid, wherein the second set of values comprises mobile device location information and predetermined values for mobile device settings, using one or more predetermined values for the attribute associated with the mobile device location information, the use of the one or more predetermined values for the attribute eliminating a need to initiate a new processing thread to determine an actual value for the attribute and eliminating consumption of battery power for executing the new processing thread; and
    querying the first set of values, the second set of values, and the validity confirmation in a single request, to ascertain current mobile device location information.

2. The computer-storage media of claim 1, wherein retrieving the second set of values from the second source further comprises requesting latitudinal and longitudinal location information through use of a predetermined backup method.

3. The computer-storage media of claim 2, wherein the predetermined backup method populates device setting values without intervention by a new processing thread.

4. The computer-storage media of claim 3, wherein the predetermined backup method is an extensible request.

5. The method of claim 1, wherein confirming whether the retrieved first set of values is valid further comprises: verifying that the mobile device location information received from the first source contains invalid values for a mobile device location.

6. The method of claim 1, wherein retrieving the second set of values from the second source when the first set of values is not valid, further comprises: retrieving the mobile device location information from the second source without spawning a new processing thread for collection of back-up source configurations.

7. A mobile device for interfacing between location-detecting hardware sources of the mobile device and an application virtual machine initiating first and second location-determination methods in a single request, the mobile device comprising:
- a first hardware source and a second hardware source;
- a primary location component that retrieves a first set of values from the first hardware source comprising an attribute associated with mobile device location information;
- a verification component that confirms or denies the validity of the first set of values retrieved;
- a backup location component that retrieves a second set of values from the second hardware source comprising mobile device location information and predetermined values for mobile device settings, using one or more predetermined values for the attribute associated with the mobile device location information, the use of the one or more predetermined values for the attribute eliminating a need to initiate a new processing thread to determine an actual value for the attribute and eliminating consumption of battery power for executing the new processing thread; and
- a location update component that queries the primary location component, the verification component, and the backup location component in a single request to ascertain current mobile device location information.

8. The mobile device of claim 7, wherein the location update component completes the query of the backup location component without spawning a new processing thread.

9. The mobile device of claim 7, wherein the backup location component has predetermined values for at least one of cost allowance, device power consumption, information requirement, accuracy, and preferred response time settings of the mobile device.

10. The mobile device of claim 9, wherein a device power consumption setting includes at least one of low, medium, and high power usage settings.

11. The mobile device of claim 9, wherein information requirement settings include at least one of speed, course, address, and altitude information requirements.

12. The mobile device of claim 11, wherein each information requirement setting is configured so that the respective piece of information is not needed in determining device location.

13. The mobile device of claim 9, wherein at least one accuracy setting includes at least one of horizontal, vertical, latitudinal, and longitudinal accuracy settings.

14. The mobile device of claim 13, wherein each accuracy setting is configured so that any accuracy level is acceptable in determining device location.

15. The mobile device of claim 9, wherein the preferred response time setting does not specify a time needed to return to a value.

16. A computer-implemented method of interfacing a mobile device and an application virtual machine, using a computing system having processor, memory, and data storage components, the computer-implemented method comprising:
- retrieving, from a first source, a first set of values comprising an attribute associated with mobile device location information;
- when the first set of values is not valid, retrieving from a second source, a second set of values comprising mobile device location information and predetermined values for mobile device settings and using one or more predetermined values for the attribute, wherein the using eliminates a need to initiate a new processing thread and associated battery power consumption to determine an actual value for the attribute; and
- querying the first set of values, the second set of values, and a validity confirmation of the first set of values in a single request to ascertain current mobile device location information.

17. The computer-implemented method of claim 16, wherein the validity confirmation comprises: verifying that the mobile device location information received from the first source contains invalid values for a mobile device location.

18. The computer-implemented method of claim 16, wherein retrieving the second set of values from the second source when the first set of values is not valid, further comprises: retrieving the mobile device location information from the second source without spawning a new processing thread for collection of back-up source configurations.

19. The computer-implemented method of claim 16, wherein the second set of values comprises at least one of cost allowance, device power consumption, information requirement, accuracy, and preferred response time settings of the mobile device.

20. The computer-implemented method of claim 19, wherein the information requirement value comprises at least one of speed, course, address, and altitude.

\* \* \* \* \*